(12) United States Patent
Hong et al.

(10) Patent No.: US 9,348,318 B2
(45) Date of Patent: May 24, 2016

(54) EFFECTIVE LIFE INDICATOR AND STOPPER INCLUDING THE SAME

(71) Applicants: INTELLECTUAL DISCOVERY CO., LTD., Seoul (KR); INDITECHKOREA CO., LTD, Hwaseong-si, Gyeonggi-do (KR)

(72) Inventors: Gilnam Hong, Seoul (KR); Jihoon Park, Suwon-si (KR)

(73) Assignees: INTELLECTUAL DISCOVERY CO., LTD., Seoul (KR); INDITECHKOREA CO., LTD, Hwaseong-Si (KR)

( * ) Notice: Subject to any disclaimer, the term of this patent is extended or adjusted under 35 U.S.C. 154(b) by 209 days.

(21) Appl. No.: 14/266,000

(22) Filed: Apr. 30, 2014

(65) Prior Publication Data

US 2014/0318437 A1 Oct. 30, 2014

(30) Foreign Application Priority Data

Apr. 30, 2013 (KR) .................. 10-2013-0048100

(51) Int. Cl.
| | |
|---|---|
| *G04F 1/00* | (2006.01) |
| *G04F 1/06* | (2006.01) |
| *G01K 3/04* | (2006.01) |
| *G01K 5/02* | (2006.01) |
| *G01K 5/04* | (2006.01) |

(Continued)

(52) U.S. Cl.
CPC .. *G04F 1/06* (2013.01); *G04F 1/00* (2013.01); *B65D 5/747* (2013.01); *B65D 5/748* (2013.01); *B65D 51/22* (2013.01); *B65D 51/226* (2013.01); *G01K 1/02* (2013.01); *G01K 3/04* (2013.01); *G01K 5/02* (2013.01); *G01K 5/04* (2013.01); *G01K 5/12* (2013.01); *G01K 11/06* (2013.01); *G01K 2207/04* (2013.01); *G04F 1/02* (2013.01)

(58) Field of Classification Search
CPC ............. G01K 1/02; G01K 1/12; G01K 5/02; G01K 5/04; G01K 5/12; G01K 3/04; G01K 2207/04; G01K 11/06; B65D 51/226; B65D 51/22; B65D 5/747; B65D 7/48; G04F 1/02; G04F 1/06; G04F 1/04; G04F 1/00
USPC .......... 116/206–207, 216–220; 374/102, 104, 374/106, 159, 160, 161, 162; 206/219, 222, 206/459.1, 534; 215/295–297; 220/265, 220/277–278
See application file for complete search history.

(56) References Cited

U.S. PATENT DOCUMENTS

| | | | | |
|---|---|---|---|---|
| 2,953,921 A | * | 9/1960 | Muncheryan | ............. A61J 9/02 116/216 |
| 3,233,459 A | * | 2/1966 | Loomis | .................. G01K 11/06 116/206 |

(Continued)

*Primary Examiner* — R. A. Smith
*Assistant Examiner* — Tania Courson
(74) *Attorney, Agent, or Firm* — Rothwell, Figg, Ernst & Manbeck, P.C.

(57) ABSTRACT

Provided is an effective life indicator and a stopper including the same, and more particularly, to an effective life indicator and a stopper including the same that are capable of allowing a consumer to easily check a drinkable or usable period after opening a beverage or medicine accommodated in a container by maintaining a state in which a development material receiving section is ruptured by a pressure applied to the container when the stopper is coupled to the container and starting an operation as a development material is leaked to the outside to come in contact with a development medium member when the stopper is initially separated from the container.

16 Claims, 5 Drawing Sheets

(51) Int. Cl.
  *G01K 5/12*     (2006.01)
  *G01K 1/02*     (2006.01)
  *G01K 11/06*    (2006.01)
  *B65D 51/22*    (2006.01)
  *B65D 5/74*     (2006.01)
  *G04F 1/02*     (2006.01)

(56) References Cited

U.S. PATENT DOCUMENTS

| | | | | |
|---|---|---|---|---|
| 3,736,899 A * | 6/1973 | Manske | ............... | B65D 79/005 116/270 |
| 4,502,605 A * | 3/1985 | Wloszczyna | ........ | B65D 55/066 215/203 |
| 4,793,503 A * | 12/1988 | Towns | .................... | B65D 55/02 206/807 |
| 5,056,681 A * | 10/1991 | Howes | .................. | B65D 25/00 206/457 |
| 5,335,994 A * | 8/1994 | Weynant nee Girones | ................. | G01K 5/483 116/216 |
| 5,625,347 A * | 4/1997 | MacLean | ............ | B65D 51/248 206/459.1 |
| 5,695,284 A * | 12/1997 | Waters | ................. | G01K 11/06 116/207 |
| 5,839,592 A * | 11/1998 | Hayes | .................... | B32B 27/08 215/230 |
| 6,545,594 B1 * | 4/2003 | Knight | ................. | B65D 55/028 206/217 |
| 6,772,910 B1 * | 8/2004 | Coory | ................. | B65D 47/242 222/153.05 |
| 6,831,552 B2 * | 12/2004 | Lin | ........................ | B65D 41/34 215/200 |
| 7,287,485 B2 * | 10/2007 | Petrakis | ................. | G01K 5/483 116/216 |
| 7,607,402 B2 * | 10/2009 | Petrakis | ............. | A61M 31/002 116/200 |
| 7,621,231 B2 * | 11/2009 | McNeely | ................. | A61J 7/04 116/308 |
| 7,819,266 B2 * | 10/2010 | Ross | ...................... | B32B 5/245 215/230 |
| 8,944,284 B2 * | 2/2015 | Milan | ................... | B65D 79/02 222/23 |
| 2004/0099203 A1 * | 5/2004 | Parker | .................... | G01K 11/06 116/216 |
| 2006/0124577 A1 * | 6/2006 | Ross | ..................... | B32B 5/245 215/347 |
| 2010/0012018 A1 * | 1/2010 | Ribi | ....................... | C09B 57/10 116/207 |
| 2010/0089776 A1 * | 4/2010 | Anthony | ............... | B65D 5/748 206/222 |
| 2011/0216627 A1 * | 9/2011 | Ziemba | ................. | B65D 77/00 368/10 |
| 2014/0211827 A1 * | 7/2014 | Rohr | ....................... | G01K 3/04 374/102 |
| 2014/0262898 A1 * | 9/2014 | Anderson | ............. | B65D 85/00 206/459.1 |

* cited by examiner

[Coupled state of container and stopper]

[Operation starts when stopper is initially separated from container]

[Expiration of effective time after opening]

FIG. 6

EFFECTIVE LIFE INDICATOR AND STOPPER INCLUDING THE SAME

CROSS-REFERENCE TO RELATED APPLICATION

This application claims priority to and the benefit of Korean Patent Application No. 10-2013-0048100, filed on Apr. 30, 2013, the disclosure of which is incorporated herein by reference in its entirety.

BACKGROUND

1. Field of the Invention

The present invention relates to an effective life indicator and a stopper including the same, and more particularly, to an effective life indicator and a stopper including the same that are capable of allowing a consumer to easily check a drinkable or usable period after opening a beverage or medicine accommodated in a container by maintaining a state in which a development material receiving section is ruptured by a pressure applied to the container when the stopper is coupled to the container and starting an operation as a development material is leaked to the outside to come in contact with a development medium member when the stopper is initially separated from the container.

2. Discussion of Related Art

In recent times, as a refrigeration and freezing industry is advanced, foods and medicines that require freezing and refrigeration should be appropriately managed, and in particular, the foods or medicines that require a strict temperature management during distribution should be always maintained in a fresh state during the entire distribution process from producers to consumers.

When such foods or medicines are exposed to a non-regulated temperature for a certain time or more, since an ingredient or contents thereof may be spoiled to cause a serious side effect of a user, it is very important for a consumer to check a distribution process of the foods and medicines with the naked eye.

Accordingly, a plurality of methods and apparatuses for allowing a consumer to determine whether the foods or medicines are distributed under the regulated temperature management are disclosed, a temperature and time indicator (such as time temperature indicator, TTI) (an instrument or a label attached to each of the corresponding products and configured to display accumulated temperature and time records in the products) is used by an international major company such as 3M or the like, and various kinds of TTIs are developed and used.

Meanwhile, as described above, most of the temperature and time indicators developed and used until now have a function of allowing a consumer to determine only whether the foods or medicines are distributed at an appropriate refrigeration or freezing temperature during the distribution process.

That is, the temperature and time indicators can only function to allow a user to confirm whether the foods or medicines are distributed in an appropriate temperature range during the process until arrival at the user, but cannot check (i) whether the foods or medicines are stored at an appropriate temperature, or (ii) whether the drinkable or usable time periods of the foods and medicines are expired after the user purchases and opens the foods or medicines.

Moreover, (iii) an expiration date applied to the foods or medicines merely shows a period in which the foods or medicines can be distributed after manufacture, but cannot propose a guide how long the foods or medicines could be used or drunk.

Accordingly, in order to solve the functional problems of the conventional temperature and time indicator, the inventor(s) has invented an effective life indicator attached to a stopper and configured to start an operation when the stopper is initially separated from a container and capable of allowing a consumer to easily check a drinkable or usable time period after opening beverages or medicines contained in the container, and the stopper including the same.

SUMMARY OF THE INVENTION

In order to solve the above-mentioned problems, the present invention is directed to provide an effective life indicator and a stopper including the same that are capable of allowing a consumer to easily check a drinkable or usable period after opening a beverage or medicine accommodated in a container by rupturing a development material receiving section by a pressure applied to the container when the stopper is coupled to the container and starting an operation as a development material is leaked to the outside to come in contact with a development medium member when the stopper is initially opened.

In order to accomplish the above-mentioned aspect, the present invention is directed to an effective life indicator including: a development material receiving section configured to accommodate a development material; a development medium member configured to absorb and diffuse the development material; a rupture member configured to leak the development material to the outside when the rupture member ruptures the development material receiving section and is separated therefrom; and a housing configured to accommodate the development material receiving section, the development medium member, and the rupture member therein and attached to an inner side of a stopper of a container, wherein the rupture member ruptures the development material receiving section using a pressure applied by the container when the stopper is coupled to the container, and the development material is leaked to the outside and comes in contact with the development medium member to start an operation thereof when the stopper is initially separated from the container.

Preferably, the development material receiving section may further include one or more rupture sections formed of a relatively thin material and formed at a lower section thereof, and the rupture member may further include a conical projection at a position corresponding to the one more rupture section.

Here, a washer-shaped rubber member may be provided between the development material receiving section and the rupture member, and the development material may be prevented from being leaked from the development material receiving section in a state in which the stopper is coupled to the container.

Preferably, the development material receiving section may be formed of an elastic material, and the rupture member may further include a conical projection.

Here, a thorny section extending upward may be provided over the projection, and the thorny section may prevent a leakage of the development material from the development material receiving section in a state in which a portion of the development material receiving section is ruptured and the stopper is coupled to the container.

Preferably, the development medium member may be formed of a micro-porous film, and a blocking film configured to block movement of the development material may be formed under the development medium member.

Preferably, the housing may be formed of a material such as PET and PE film that is able to be easily bent by a pressure.

Preferably, the effective life indicator may further include a diffusion member configured to absorb and diffuse the development material such that the development material leaked from the development material receiving section is able to come in contact with the development medium member.

Preferably, the diffusion member may be formed to surround upper and lower portions of the development material receiving section.

In addition, in order accomplish the above-mentioned aspect, a stopper of a container according to the present invention includes an effective life indicator, and the effective life indicator includes: a development material receiving section configured to accommodate a development material; a development medium member configured to absorb and diffuse the development material; a rupture member configured to leak the development material to the outside when the rupture member ruptures the development material receiving section and is separated therefrom; and a housing configured to accommodate the development material receiving section, the development medium member, and the rupture member therein and attached to an inner side of the stopper of the container, wherein the rupture member ruptures the development material receiving section using a pressure applied by the container when the stopper is coupled to the container, and the development material is leaked to the outside and comes in contact with the development medium member to start an operation thereof when the stopper is initially separated from the container, and the stopper comprises one or more display units configured to allow recognition of one or more of starting and termination of an operation of the effective life indicator.

Here, the one or more display units may include an operation starting section disposed at a position corresponding to a position at which the development material initially comes in contact with the development medium member such that the starting of the operation of the effective life indicator is able to be recognized.

Here, the one or more display units may include an operation termination section disposed at a position corresponding to a position at which the development material finally comes in contact with the development medium member such that expiration of a drinkable time period of contents accommodated in the container is able to be recognized.

Preferably, the one or more display units may be a display window type in which a print having a certain shape is attached or printed on the stopper when the stopper has a display hole or the stopper itself has a transparent material.

According to the present invention, as the effective life indicator is attached to the stopper through press-fitting, the effective life indicator can be attached to the product and used without a separate additional process.

In addition, according to the present invention, as the effective life indicator is configured to start the operation thereof when the stopper is initially opened after the stopper is coupled to the container filled with the contents, the operation of the effective life indicator can be started without an additional process. Accordingly, the consumer can more easily recognize the drinkable or usable time period after opening of the beverage or medicines accommodated in the container.

Moreover, cost reduction and improvement of productivity can be obtained due to removal of an additional process.

In addition, according to the present invention, when the content-filled container is sealed and then initially opened, the effective life indicator automatically starts the operation thereof without separate manipulation, and thus, reliability of the effective life indicator for the consumer can be improved.

Additionally, according to the present invention, the stopper including the above-mentioned effective life indicator therein includes the one or more display units configured to recognize any one or more of the operation starting and termination of the effective life of the effective life indicator. Accordingly, the consumer can more easily check whether the product is drinkable and/or usable after opening, and drinking and/or use of the product having the expired effective life can be excluded.

BRIEF DESCRIPTION OF THE DRAWINGS

The above and other objects, features, and advantages of the present invention will become more apparent to those of ordinary skill in the art by describing in detail exemplary embodiments thereof with reference to the accompanying drawings, in which:

FIG. 4(a) is a view showing a state before the stopper to which the effective life indicator 100 is attached is coupled to a container, FIG. 4(b) is a view showing a state in which the stopper to which the effective life indicator 100 is attached is coupled to the container, and FIG. 4(c) is a view showing a state in which the stopper to which the effective life indicator 100 is attached is initially separated from the container;

FIG. 5(a) is a view showing a state before and after the stopper is coupled to the container, FIG. 5(b) is a view showing a state in which the stopper is initially separated from the container, and FIG. 5(c) is a view showing a state after a preset effective life is expired.

DETAILED DESCRIPTION OF EXEMPLARY EMBODIMENTS

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

An exemplary embodiment of an effective life indicator and a stopper including the same according to the present invention will be described with reference to the accompanying drawings. In this regard, thicknesses of lines or sizes of components shown in the drawings may be exaggerated for the purpose of clarity and convenience of description. In addition, terms to be described are terms defined in consideration of functions in the present invention and may differ according to intensions of a user or an operator or customs. Accordingly, definitions of these terms should be described based on contents throughout the specification.

First Embodiment

Figure 1:
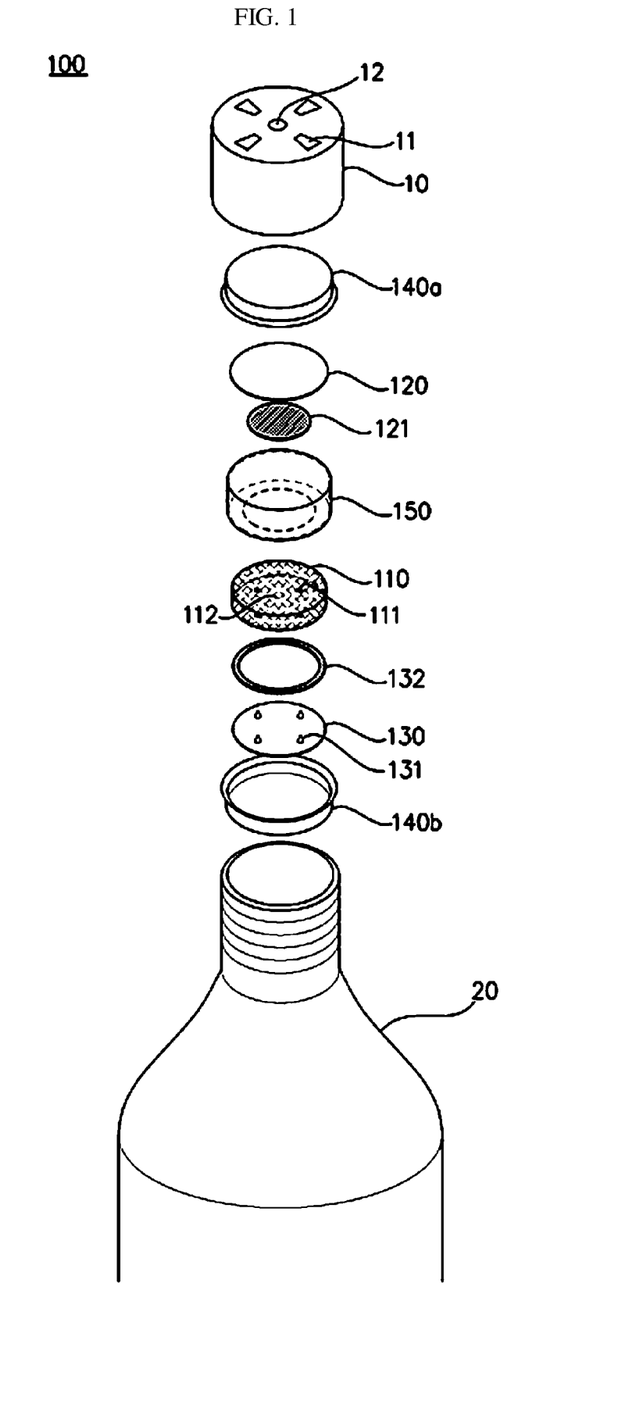
FIG. 1 is an exploded perspective view of an effective life indicator 100 and a stopper including the same according to an embodiment of the present invention.
Figure 2:
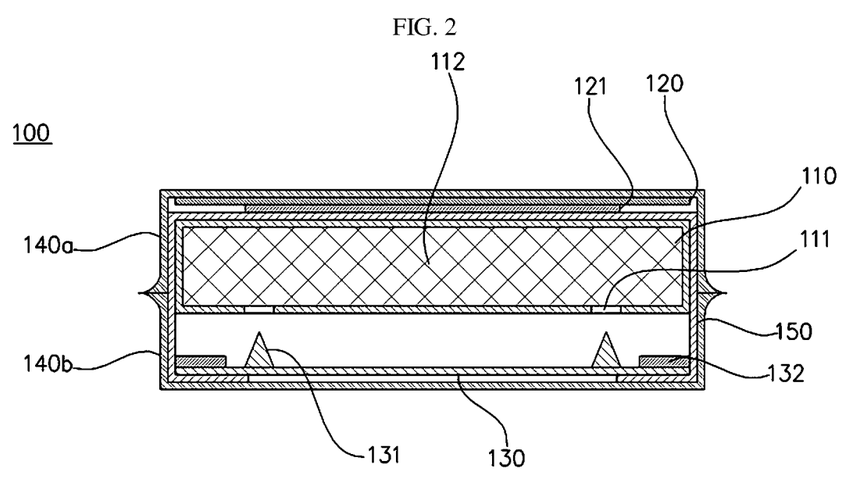
FIG. 2 is a cross-sectional view schematically showing the effective life indicator 100 according to the embodiment of the present invention.
Figure 3:
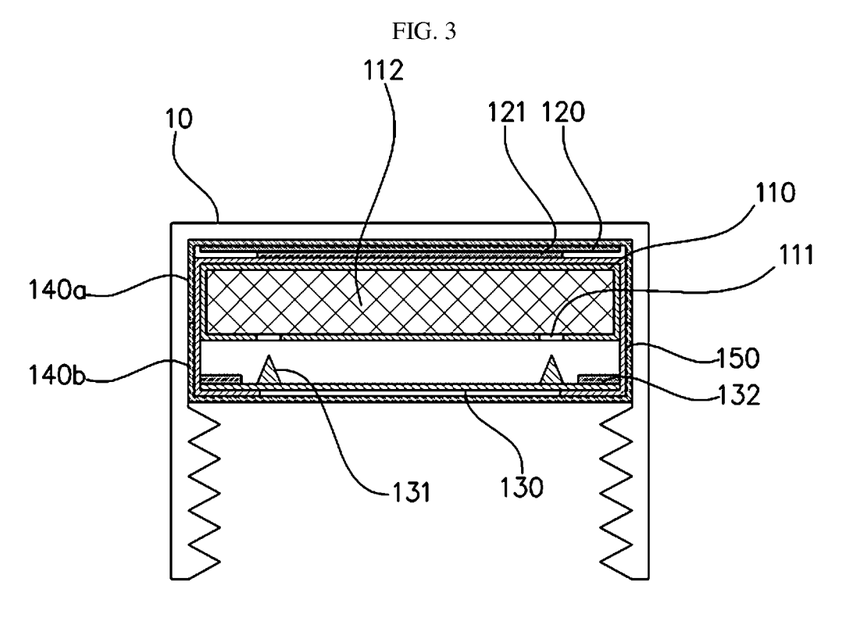
FIG. 3 is a view schematically showing a state in which the effective life indicator 100 according to the embodiment of the present invention is attached into the stopper.

FIG. 1 is an exploded perspective view of an effective life indicator 100 and a stopper including the same according to an embodiment of the present invention, FIG. 2 is a cross-sectional view schematically showing the effective life indicator 100 according to the embodiment of the present invention, and FIG. 3 is a view schematically showing a state in which the effective life indicator 100 according to the embodiment of the present invention is attached into the stopper.

The effective life indicator 100 according to the embodiment of the present invention will be described in detail with reference to FIGS. 1 to 3.

The effective life indicator 100 according to the embodiment of the present invention is attached into a stopper 10 of a container 20, and may include a development material receiving section 110, a development medium member 120, a rupture member 130, a housing 140, and a diffusion member 150.

The development material receiving section 110 functions to accommodate a development material 112 therein, and the development material 112 is melted and diffused onto the development medium member 120 (to be described below) when the development material 112 reaches at a certain temperature or departs from a certain temperature range, such that the development medium member 120 becomes transparent.

Here, the kind of the development material 112 is not limited as long as the development material 112 is melted and diffused onto the development medium member 120 according to the temperature. For example, fatty acid ester, paraffin, or the like, may be used as the development material, and other different kinds of development materials may be variously used according to the kind or characteristics of contents in the container 20.

Meanwhile, one or more rupture sections 111 formed of a relatively thin material may be formed at a lower section of the development material receiving section 110. Here, the one or more rupture sections 111 may be formed of a thin foil. The rupture section 111 may be ruptured by the rupture member 130 (to be described below), and a function of the rupture section 111 will be described below.

The development medium member 120 functions to absorb and diffuse the development material 112, and is disposed over the development material receiving section 110.

The development medium member 120 may be formed of a micro-porous film having a property that becomes transparent when it contains the development material 112, and a commercially available synthetic resin micro-porous film or the like formed of a PP or PE material may be used as the development medium member 120.

A blocking film 121 may be further provided under the development medium member 120.

The blocking film 121 functions to block movement of the development material 112 when the effective life indicator 100 starts an operation thereof.

A circular plate may be exemplarily used as the blocking film 121 of the present invention, and the blocking film 121 may have a red color or a certain color. In addition, the blocking film 121 may be formed of a synthetic resin film or a UV printed film to be disposed under the development medium member 120, thereby blocking movement of the development material 112.

The rupture member 130 functions to cause a leakage of the development material 112 accommodated in the development material receiving section 110 to the outside when the rupture member 130 ruptures a portion of the development material receiving section 110 and is separated from the development material receiving section 110.

Specifically, the rupture member 130 includes a projection 131 formed at a position corresponding to the one or more rupture sections 111, and the one or more rupture sections 111 are ruptured using the projection 131. Here, while the projection 131 may be formed in various shapes, a conical shape may be preferable.

The rupture member 130 ruptures the development material receiving section 110 using a pressure applied from the container 20 when the stopper 10 is coupled to the container 20. Here, since insertion of the projection 131 into the rupture section 111 is maintained when the container 20 is coupled to the stopper 10, the development material 112 is not leaked to the outside of the development material receiving section 110. However, when the stopper 10 is initially separated from the container 20 (i.e., when a user purchases and opens the product to which the effective life indicator 100 is attached), the projection 131 is separated from the rupture section 111, and thus, the development material 112 is leaked to the outside of the development material receiving section 110.

Then, the development material 112 leaked from the development material receiving section 110 is diffused through the diffusion member 150 (to be described below) to come in contact with the development medium member 120, and thus, the effective life indicator 100 starts an operation thereof. This will be described below.

Meanwhile, a washer-shaped rubber member 132 may be further provided between the development material receiving section 110 and the rupture member 130. The rubber member 132 functions to prevent a leakage of the development material 112 from the development material receiving section 110 and the development material 112 from coming in contact with the diffusion member 150.

That is, when the state in which the container 20 is coupled to the stopper 10 is maintained, as the state in which the projection 131 is inserted into the rupture section 111 is maintained, the development material 112 is not leaked to the outside of the development material receiving section 110. However, in order to more effectively prevent the leakage, the rubber member 132 is provided to prevent the leakage to the outside of the development material receiving section 110.

The housing 140 functions to accommodate the development material receiving section 110, the development medium member 120, the rupture member 130, and the diffusion member 150 (to be described below) therein, and is attached to an inner side of the stopper 10 of the container 20.

Here, the housing 140 may be constituted by an upper housing 140a and a lower housing 140b, and the upper housing 140a and the lower housing 140b may be configured to be blocked from the outside through a radio frequency welding or thermosetting process.

The upper housing 140a and the lower housing 140b may have a circular plate shape, may function as upper and lower cases of the effective life indicator 100, and may be formed of a material, the inside of which can be seen from the outside, such as a transparent vinyl coated film. More preferably, a material that can be easily bent by a pressure, for example, a transparent PET, PVC, PE film, or the like, may be used.

The diffusion member 150 functions to absorb and diffuse the development material 112 such that the development material 112 leaked to a lower side of the development material receiving section 110 comes in contact with the development medium member 120 disposed over the development material receiving section 110.

For this, the diffusion member 150 may have a cylindrical structure having upper and lower partially closed sides to partially surround upper and lower sides of the development material receiving section 110. In addition, a material such as non-woven fabric may be applied to the diffusion member 150 to absorb and diffuse the development material 112.

The configuration of the diffusion member 150 disclosed in the specification is an embodiment, and various configurations and materials may be applied as long as the development material 112 leaked from the development material receiving section 110 can come in contact with the development medium member 120.

In addition, the present invention relates to the stopper 10 of the container 20 including the effective life indicator 100. Referring to FIGS. 1 and 3, the stopper 10 of the container 20 includes the above-mentioned effective life indicator 100 disposed therein.

The effective life indicator 100 may include the development material receiving section 110, the development medium member 120, the rupture member 130, the housing 140, and the diffusion member 150. Meanwhile, since such components are described above in detail, description thereof will be omitted.

Here, while the effective life indicator 100 is described as being press-fitted into the stopper 10, an attachment method is not limited as long as the indicator is securely fixed to the inner side of the stopper 10 or may be integrally formed with the stopper 10.

The stopper 10 includes at least one or more display units such that any one of the starting and termination of the operation of the effective life indicator 100 (i.e., a state in which the product arrives at the effective life, which is drinkable and usable, after opening the product) can be recognized.

The display unit may be classified into an operation starting section 11 and an operation termination section 12.

The operation starting section 11 helps a consumer to easily recognize the starting of the operation of the effective life indicator 100 (i.e., the fact that the stopper 10 is already separated from the container 20 once) and is formed at a position corresponding to the position at which the development material first comes in contact with the development medium member 120. Referring to FIG. 1, it will be appreciated that the operation starting sections 11 are formed at a periphery of the stopper 10 at constant intervals.

The operation termination section 12 helps the consumer to easily check whether the usable or drinkable time period of the contents in the container is expired, and is formed at a position corresponding to the position at which the development material finally comes in contact with the development medium member 120. Referring to FIG. 1, it will be appreciated that the operation termination section 12 is formed at about a center of the stopper 10.

In FIG. 1, while shapes of the operation starting section 11 and the operation termination section 12 are shown as having a constant hole or aperture formed in the stopper 10 itself, the shapes of the operation starting section 11 and the operation termination section 12 are not limited thereto. For example, when the stopper 10 itself has a transparent material, a print having a certain shape may be attached or printed on the stopper 10 to form the operation starting section 11 and the operation termination section 12 in a display window type.

An operating principle and a state of the stopper 10 including the effective life indicator 100 according to the above-mentioned configuration will be described in detail with reference to FIGS. 4 and 5.

Figure 4:
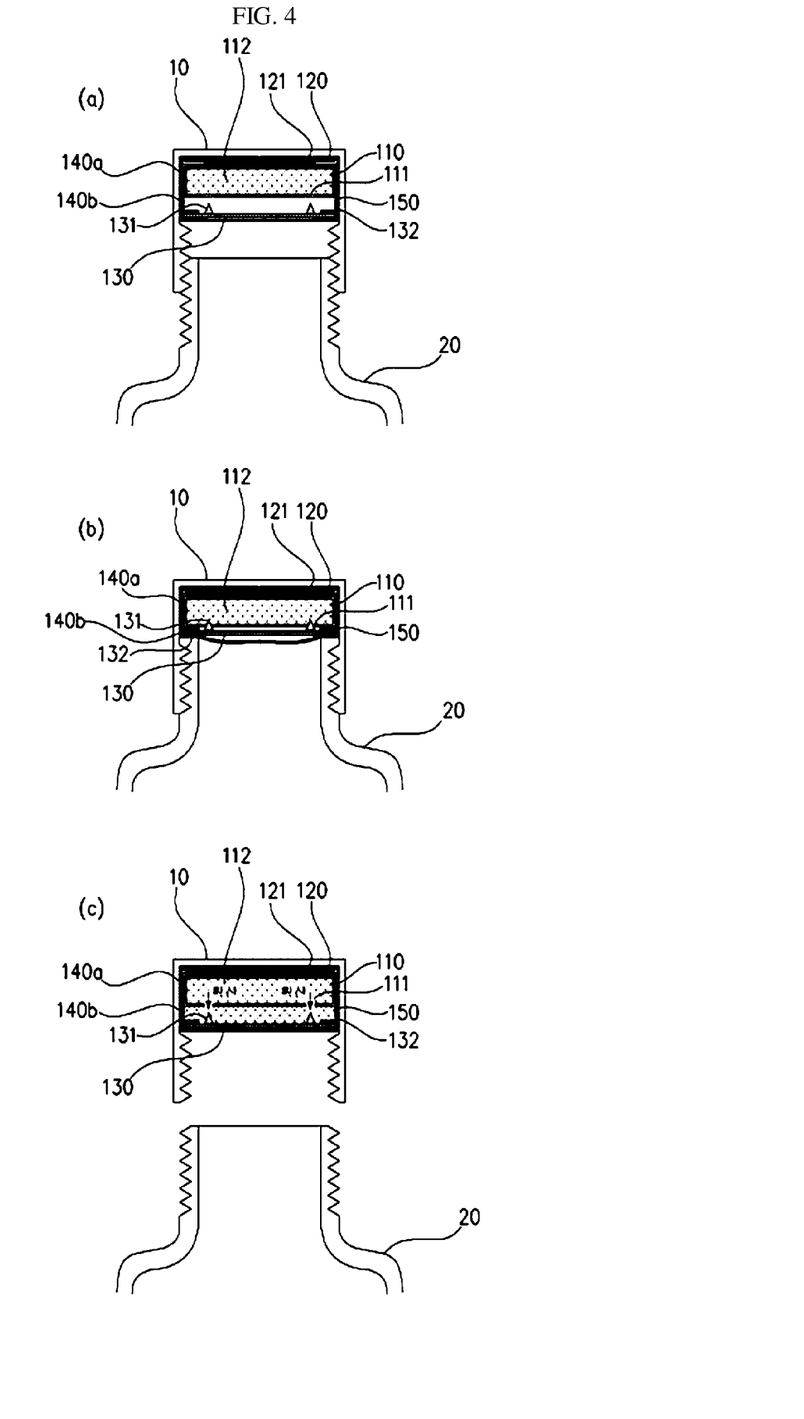
FIG. 4 is a view specifically showing operation states of the effective life indicator 100 according to the embodiment of the present invention.
Figure 5:
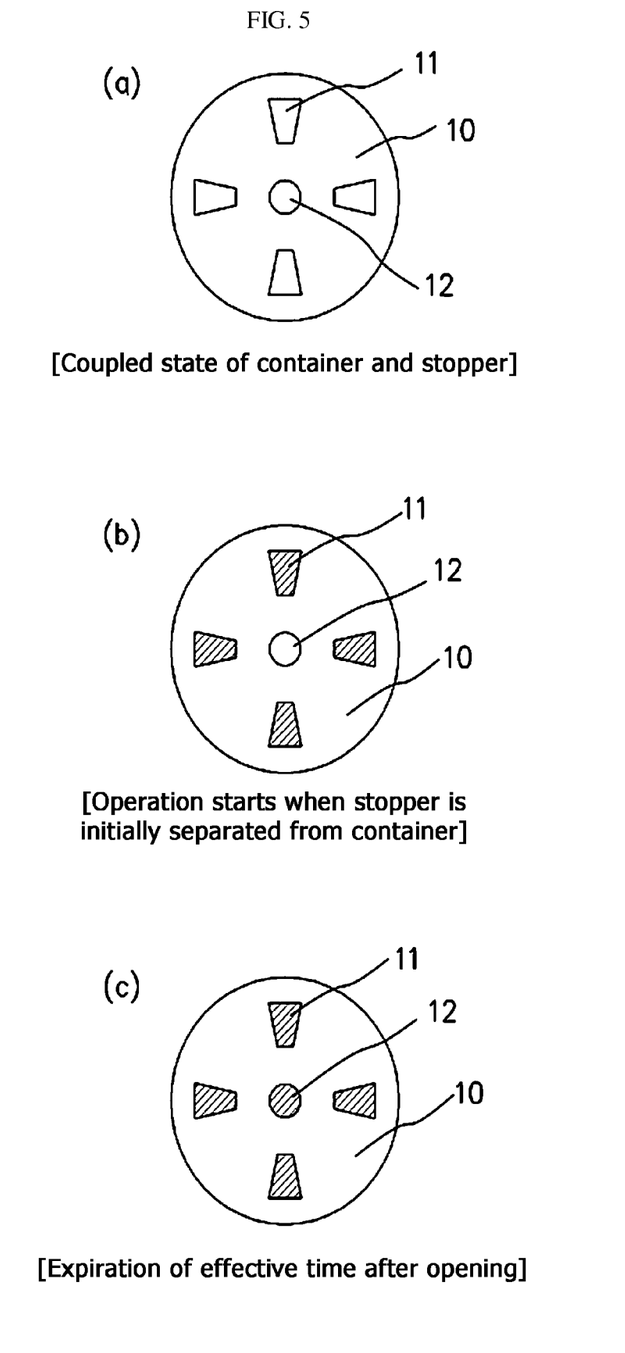
FIG. 5 is a plan view showing states according to steps of the stopper to which the effective life indicator 100 according to the embodiment of the present invention is attached.

FIG. 4 is a view specifically showing an operating state of the effective life indicator 100 according to the embodiment of the present invention, and FIG. 5 is a plan view showing states according to steps of the stopper to which the effective life indicator 100 according to the embodiment of the present invention is attached.

FIG. 4(a) shows a state before the stopper 10 to which the effective life indicator 100 is attached is coupled to the container 20.

Before the stopper 10 is coupled to the container 20, as described above, the effective life indicator 100 is press-fitted into a lower side of the stopper 10, and the stopper 10 is coupled along a screw groove of the container 20.

Here, no variation in color is detected through the operation starting section 11 and the operation termination section 12 of the stopper 10 (see FIG. 5(a)).

FIG. 4(b) shows a state in which the stopper 10 to which the effective life indicator 100 is attached is coupled to the container 20.

Specifically, when the stopper 10 is coupled to the container 20, a lower portion of the effective life indicator 100 is pressed by the pressure applied from the container 20. Accordingly, the projection 131 of the rupture member 130 ruptures the rupture section 111 of the development material receiving section 110. Here, since the state in which the container 20 is coupled to the stopper 10 is maintained, the state in which the projection 131 is inserted into the rupture section 111 is maintained, and since the rubber member 132 is disposed in place, the development material 112 does not leak to the outside the development material receiving section 110.

Here, since the effective life indicator 100 still does not start the operation thereof, no variation in color is detected through the operation starting section 11 and the operation termination section 12 of the stopper 10 (see FIG. 5(a)).

FIG. 4(c) shows a state in which the stopper 10 to which the effective life indicator 100 is attached is initially separated from the container 20 (i.e., when a user purchases and initially opens the product to which the effective life indicator 100 is attached).

When the stopper 10 is initially separated from the container 20, the projection 131 is separated from the rupture section 111, and thus, the development material 112 is leaked to the outside of the development material receiving section 110. The leaked development material 112 is diffused through the diffusion member 150 to come in contact with the development medium member 120. As described above, the effective life indicator 100 starts the operation thereof due to the initial contact between the development material 112 and the development medium member 120.

Here, a portion of the development medium member 120 in contact with the development material 112 becomes transparent, and thus, the red color of the blocking film 121 can be seen through the operation starting section 11 from the outside (see FIG. 5(b)). That is, the user can see the red color of the blocking film 121 through the operation starting section 11 formed at the stopper 10 to easily recognize that the effective life indicator 100 has started the operation thereof.

As a certain time elapses after the stopper 10 is initially separated from the container 20, the development material 112 is gradually diffused and deployed toward a center of the development medium member 120. Here, a diffusion speed of the development material 112 may be adjusted to be set such that the development material 112 arrives at the center of the development medium member 120 to correspond to the effective life after the opening.

According to the above-mentioned configuration, when the effective life after the opening is expired, the red color of the blocking film 121 can be seen through the operation termination section 12 (see FIG. 5C). That is, the user can see the red color of the blocking film 121 through the operation termination section 12 formed at the stopper 10 so that the drinkable or usable time period of the product can be easily recognized.

Second Embodiment

Figure 6:
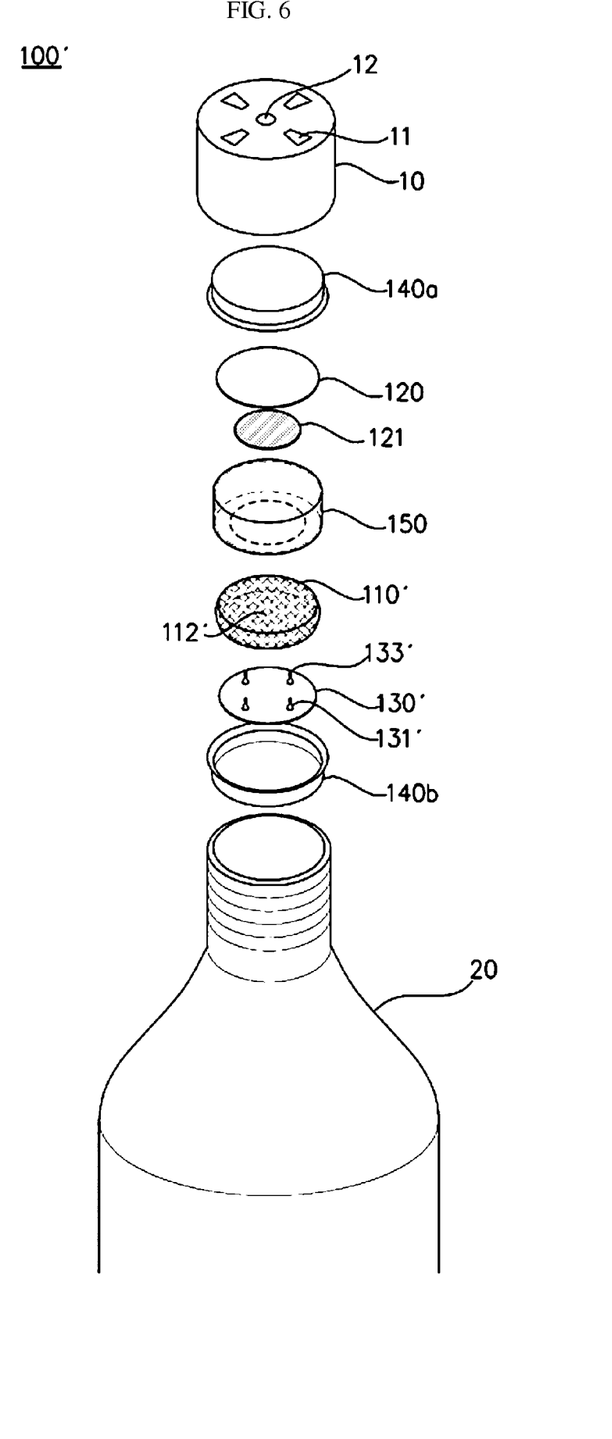
FIG. 6 is an exploded perspective view according to an effective life indicator 100' and a stopper including the same according to another embodiment of the present invention.

FIG. 6 is an exploded perspective view of an effective life indicator 100' and a stopper including the same according to another embodiment of the present invention.

Since the effective life indicator 100' shown in FIG. 6 includes the same components as the effective life indicator 100 shown in FIGS. 1 to 5 except that a development material receiving section 110' is formed of an elastic material and a thorny section 133' is further provided on a projection 131' instead of one or more of the rupture section 111 and the rubber member 132 of the development material receiving section 110, description of the same components will be omitted.

The development material receiving section 110' may be formed of an elastic material, and a development material 112' is accommodated therein to a certain height (i.e., the development material is not fully filled therein). Here, the development material receiving section 110' may be formed of a material having elasticity and that can be partially ruptured when a certain pressure or more is applied, for example, a vinyl tube, a thin rubber tube, or the like.

A rupture member 130' functions to leak the development material 112' accommodated in the development material receiving section 110' to the outside when the development material receiving section 110' is ruptured and separated.

Specifically, the rupture member 130' may include a conical projection 131' and the thorny section 133' extending upward from the projection 131'.

According to the above-mentioned configuration, the projection 131' and the thorny section 133' of the rupture member 130' rupture the development material receiving section 110' to form a hole having a certain size using the pressure applied from the container 20 when the stopper 10 is coupled to the container 20.

Here, when the state in which the container 20 is coupled to the stopper 10 is maintained, a hole formed by the projection 131' and the thorny section 133' is disposed at a position higher than the height at which the development material 112' is accommodated so that the development material 112' is not leaked to the outside of the development material receiving section 110'.

However, when the stopper 10 is initially separated from the container 20 (i.e., when a user purchases and opens the product to which the effective life indicator 100' is attached), the projection 131' and the thorny section 133' are separated from the development material receiving section 110', and thus, the development material 112' is leaked to the outside of the development material receiving section 110'.

Then, as described above, the development material 112' leaked from the development material receiving section 110' is diffused through the diffusion member 150 to come in contact with the development medium member 120, and thus, the effective life indicator 100' starts an operation thereof.

Here, in FIG. 6, while the projection 131' and the thorny section 133' are shown as having a conical shape and a sharply protruding shape, various modifications may be applied.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. An effective life indicator configured to display a drinkable or usable time period after opening, the effective life indicator comprising:
    a development material receiving section configured to accommodate a development material;
    a development medium member configured to absorb and diffuse the development material;
    a rupture member configured to leak the development material to the outside when the rupture member ruptures the development material receiving section and is separated therefrom; and
    a housing configured to accommodate the development material receiving section, the development medium member, and the rupture member therein and attached to an inner side of a stopper of a container,
    wherein the rupture member ruptures the development material receiving section using a pressure applied by the container when the stopper is coupled to the container, and the development material is leaked to the outside and comes in contact with the development medium member to start an operation thereof when the stopper is initially separated from the container.

2. The effective life indicator according to claim 1, wherein the development material receiving section further comprises one or more rupture sections formed of a relatively thin material and formed at a lower section thereof, and
    the rupture member further comprises a conical projection at a position corresponding to the one more rupture section.

3. The effective life indicator according to claim 2, wherein a washer-shaped rubber member is provided between the development material receiving section and the rupture member, and the development material is prevented from being leaked from the development material receiving section in a state in which the stopper is coupled to the container.

4. The effective life indicator according to claim 3, wherein the development medium member is formed of a micro-porous film, and a blocking film configured to block movement of the development material is formed under the development medium member.

5. The effective life indicator according to claim 3, wherein the housing is formed of a material such as PET and PE film that is able to be easily bent by a pressure.

6. The effective life indicator according to claim 3, wherein the effective life indicator further comprises a diffusion member configured to absorb and diffuse the development material such that the development material leaked from the development material receiving section is able to come in contact with the development medium member.

7. The effective life indicator according to claim 1, wherein the development material receiving section is formed of an elastic material, and the rupture member further comprises a conical projection.

8. The effective life indicator according to claim 7, wherein a thorny section extending upward is provided over the projection, and
the thorny section prevents a leakage of the development material from the development material receiving section in a state in which a portion of the development material receiving section is ruptured and the stopper is coupled to the container.

9. The effective life indicator according to claim 1, wherein the development medium member is formed of a micro-porous film, and
a blocking film configured to block movement of the development material is formed under the development medium member.

10. The effective life indicator according to claim 1, wherein the housing is formed of a material such as PET and PE film that is able to be easily bent by a pressure.

11. The effective life indicator according to claim 1, wherein the effective life indicator further comprises a diffusion member configured to absorb and diffuse the development material such that the development material leaked from the development material receiving section is able to come in contact with the development medium member.

12. The effective life indicator according to claim 11, wherein the diffusion member is formed to surround upper and lower portions of the development material receiving section.

13. A stopper of a container comprising an effective life indicator, the effective life indicator comprising:
a development material receiving section configured to accommodate a development material;
a development medium member configured to absorb and diffuse the development material;
a rupture member configured to leak the development material to the outside when the rupture member ruptures the development material receiving section and is separated therefrom; and
a housing configured to accommodate the development material receiving section, the development medium member, and the rupture member therein and attached to an inner side of the stopper of the container,
wherein the rupture member ruptures the development material receiving section using a pressure applied by the container when the stopper is coupled to the container, and the development material is leaked to the outside and comes in contact with the development medium member to start an operation thereof when the stopper is initially separated from the container, and
the stopper comprises one or more display units configured to allow recognition of one or more of starting and termination of an operation of the effective life indicator.

14. The stopper of the container comprising the effective life indicator according to claim 13, wherein the one or more display units comprise an operation starting section disposed at a position corresponding to a position at which the development material initially comes in contact with the development medium member such that the starting of the operation of the effective life indicator is able to be recognized.

15. The stopper of the container comprising the effective life indicator according to claim 13, wherein the one or more display units comprise an operation termination section disposed at a position corresponding to a position at which the development material finally comes in contact with the development medium member such that expiration of a drinkable time period of contents accommodated in the container is able to be recognized.

16. The stopper of the container comprising the effective life indicator according to claim 13, wherein the one or more display units are a display window type in which a print having a certain shape is attached or printed on the stopper when the stopper has a display hole or the stopper itself has a transparent material.

* * * * *